(12) United States Patent
Matsumoto

(10) Patent No.: US 12,358,350 B2
(45) Date of Patent: Jul. 15, 2025

(54) VEHICLE SUN VISOR

(71) Applicant: KYOWA SANGYO CORP., Toyota (JP)

(72) Inventor: Tomoko Matsumoto, Toyota (JP)

(73) Assignee: KYOWA SANGYO CORP., Toyota (JP)

( * ) Notice: Subject to any disclaimer, the term of this patent is extended or adjusted under 35 U.S.C. 154(b) by 195 days.

(21) Appl. No.: 18/119,449

(22) Filed: Mar. 9, 2023

(65) Prior Publication Data
US 2023/0286358 A1    Sep. 14, 2023

(30) Foreign Application Priority Data

Mar. 14, 2022 (JP) .................................. 2022-038994

(51) Int. Cl.
*B60J 3/02* (2006.01)
*B60R 7/05* (2006.01)

(52) U.S. Cl.
CPC .............. *B60J 3/0282* (2013.01); *B60R 7/05* (2013.01)

(58) Field of Classification Search
CPC ...... B60J 3/0282; B60J 3/0208; B60J 3/0278; B60J 3/0204; B60R 7/05
USPC ............................................. 296/97.5, 1.11
See application file for complete search history.

(56) References Cited

U.S. PATENT DOCUMENTS

| 5,577,791 | A | * | 11/1996 | Viertel | ................... | B60J 3/0282 362/144 |
| 2012/0112490 | A1 | * | 5/2012 | Fukatsu | ................. | B60J 3/0282 296/97.1 |
| 2015/0202947 | A1 | * | 7/2015 | Tamuraya | .............. | B60J 3/0282 296/97.3 |
| 2017/0274741 | A1 | | 9/2017 | Asai | | |

FOREIGN PATENT DOCUMENTS

| JP | 4113757 | B2 | * | 7/2008 |
| JP | 2017171087 | A | | 9/2017 |

* cited by examiner

*Primary Examiner* — Amy R Weisberg
*Assistant Examiner* — Denise Lynne Esquivel
(74) *Attorney, Agent, or Firm* — J. Miguel Hernandez; James R. Gourley; Carstens, Allen & Gourley, LLP

(57) ABSTRACT

A vehicle sun visor includes a hollow visor main body that includes a frame portion including an opening, a mirror that is attached to the frame portion to face the opening, and a mirror cover configured to slide relative to the visor main body between a closed position at which the mirror cover covers the mirror and an open position at which the mirror cover exposes the mirror. The vehicle sun visor further includes at least one of a first stopper portion that is disposed at a section of the frame portion on a leading side in an opening direction of the mirror cover and protrudes toward the mirror cover, or a second stopper portion that is disposed at an end portion of the mirror cover on a leading side in a closing direction of the mirror cover and protrudes toward the mirror.

8 Claims, 13 Drawing Sheets

VEHICLE SUN VISOR

CROSS-REFERENCE TO RELATED APPLICATIONS

This application claims priority to Japanese Patent Application No. 2022-038994 filed on Mar. 14, 2022. Each application, publication, and patent listed in this paragraph are hereby incorporated by reference in their entireties.

BACKGROUND

1. Field

The present disclosure relates to vehicle sun visors.

2. Description of Related Art

Vehicle sun visors are attached to a front section of the vehicle ceiling, for example. Vehicle sun visors are used to prevent light from the outside from directly entering the eyes of occupants in the passenger compartment. A vehicle sun visor may include a visor main body including a frame portion, a mirror, and a mirror cover. The visor main body is hollow. The frame portion includes an opening. The mirror is attached to the visor main body. The mirror cover is slidable relative to the visor main body between a closed position covering the mirror and an open position exposing the mirror. The mirror cover is positioned at the closed position by moving from the interior of the visor main body to a position where the mirror cover overlaps with the opening of the frame portion. Conversely, the mirror cover is positioned at the open position by retracting into the interior of the visor main body from the opening of the frame portion. Japanese Laid-Open Patent Publication No. 2017-171087, for example, discloses a vehicle sun visor including a card holder on the outer surface of the mirror cover.

With such a vehicle sun visor, an occupant may erroneously insert a card between the frame portion and the mirror cover when the mirror cover is at the closed position. Also, an occupant may erroneously insert a card between the mirror cover and the mirror when the mirror cover is at the open position. When a card is erroneously inserted as described above, the card may enter the interior of the visor main body, making it impossible to retrieve the card. As such, it is desired to avoid a card from entering the interior of the visor main body when the card is erroneously inserted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle sun visor includes a hollow visor main body that includes a frame portion including an opening, a mirror that is attached to the frame portion to face the opening, and a mirror cover configured to slide, relative to the visor main body, between a closed position at which the mirror cover covers the mirror and an open position at which the mirror cover exposes the mirror. The mirror cover is configured to be positioned at the closed position by moving from an interior of the visor main body to a position at which the mirror cover overlaps with the opening, and to be positioned at the open position by retracting into the interior of the visor main body from the opening. The vehicle sun visor further includes at least one of a first stopper portion that is disposed at a section of the frame portion on a leading side in an opening direction of the mirror cover and protrudes toward the mirror cover, or a second stopper portion that is disposed at an end portion of the mirror cover on a leading side in a closing direction of the mirror cover and protrudes toward the mirror.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Referring to FIGS. 1 to 14, a vehicle sun visor 10 according to an embodiment is now described.

<Vehicle Sun Visor 10>

Figure 1:
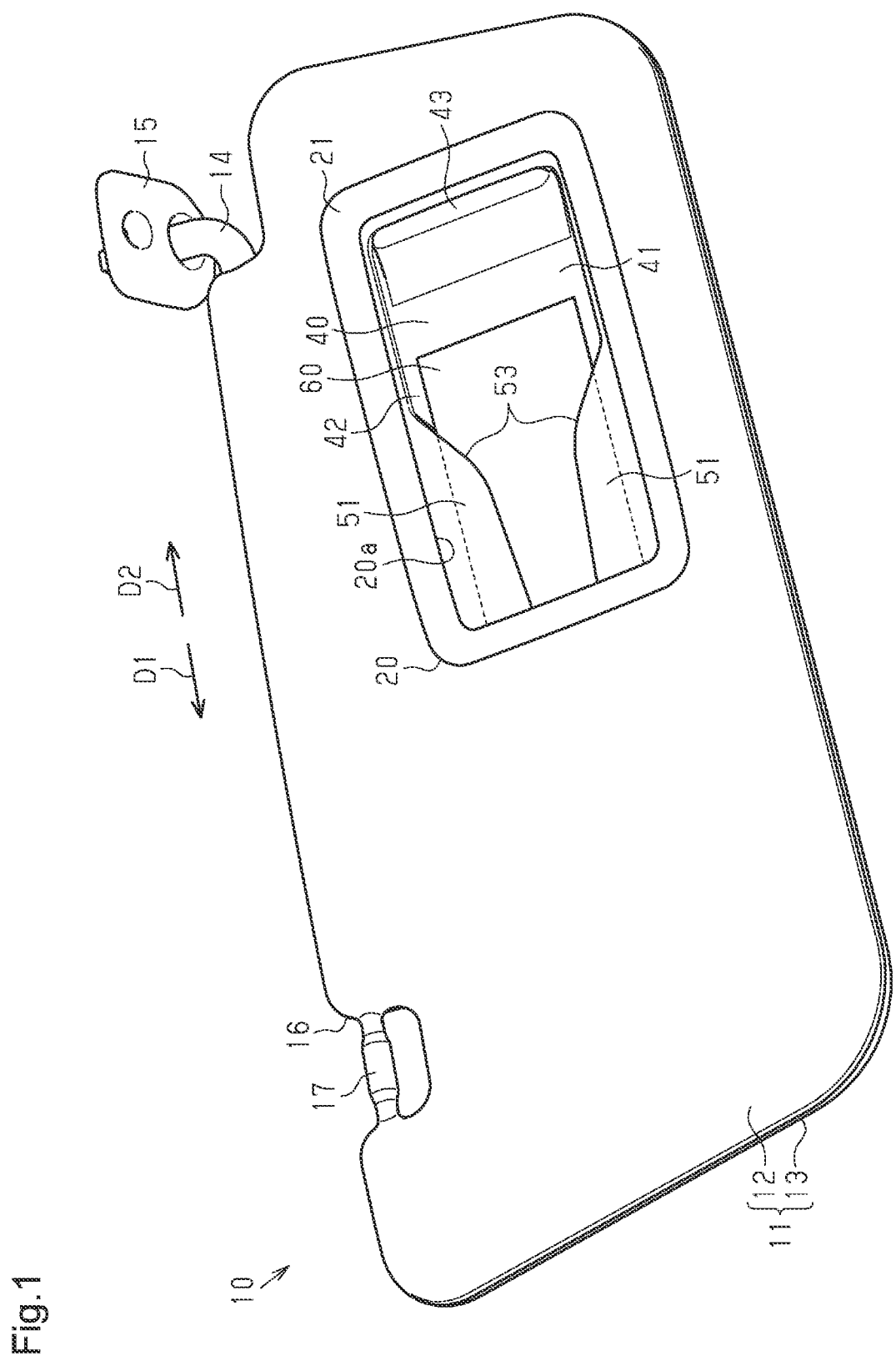
FIG. 1 is a perspective view of a vehicle sun visor according to an embodiment.
Figure 2:
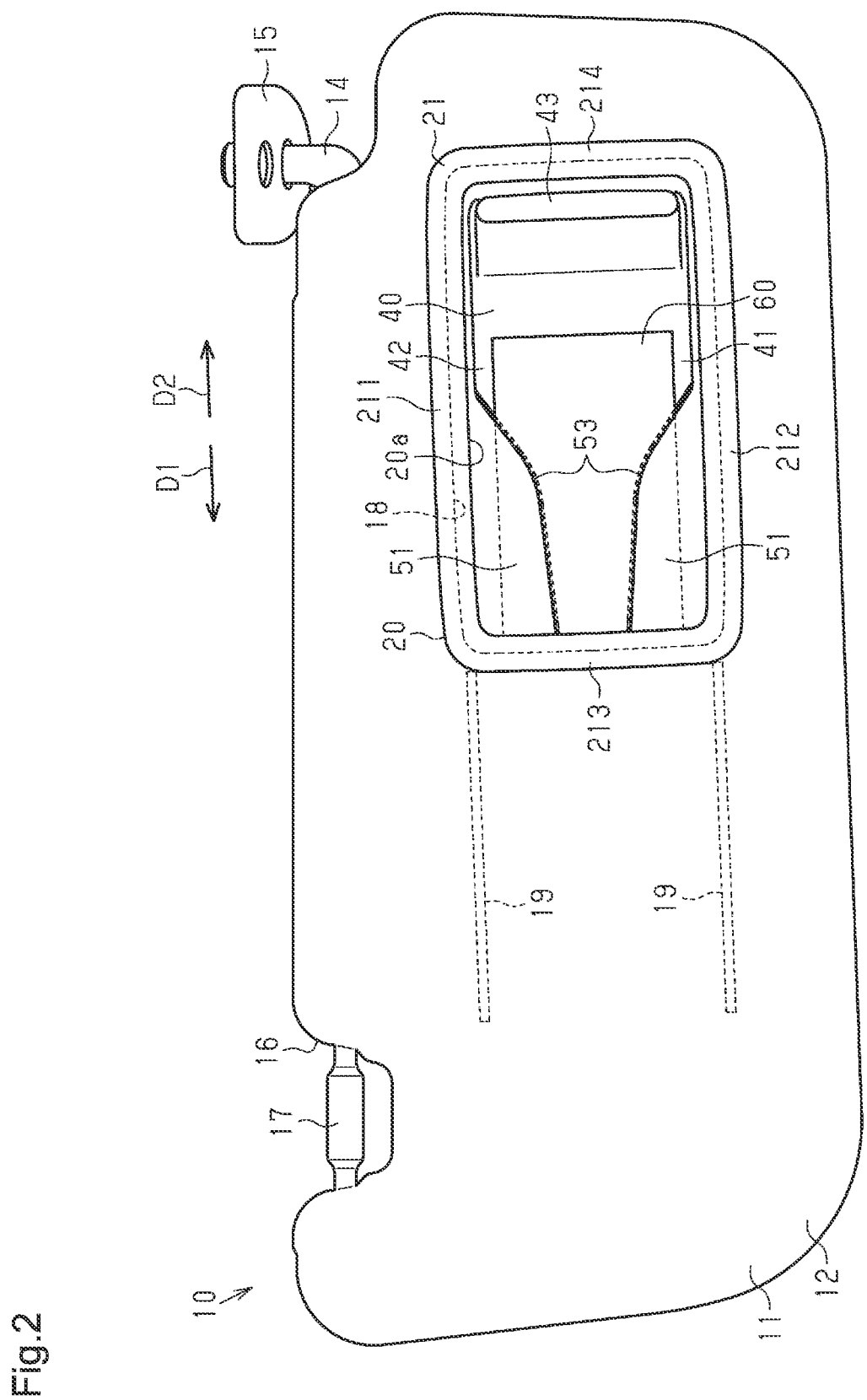
FIG. 2 is a plan view showing the vehicle sun visor of FIG. 1 with a mirror cover at a closed position.
Figure 3:
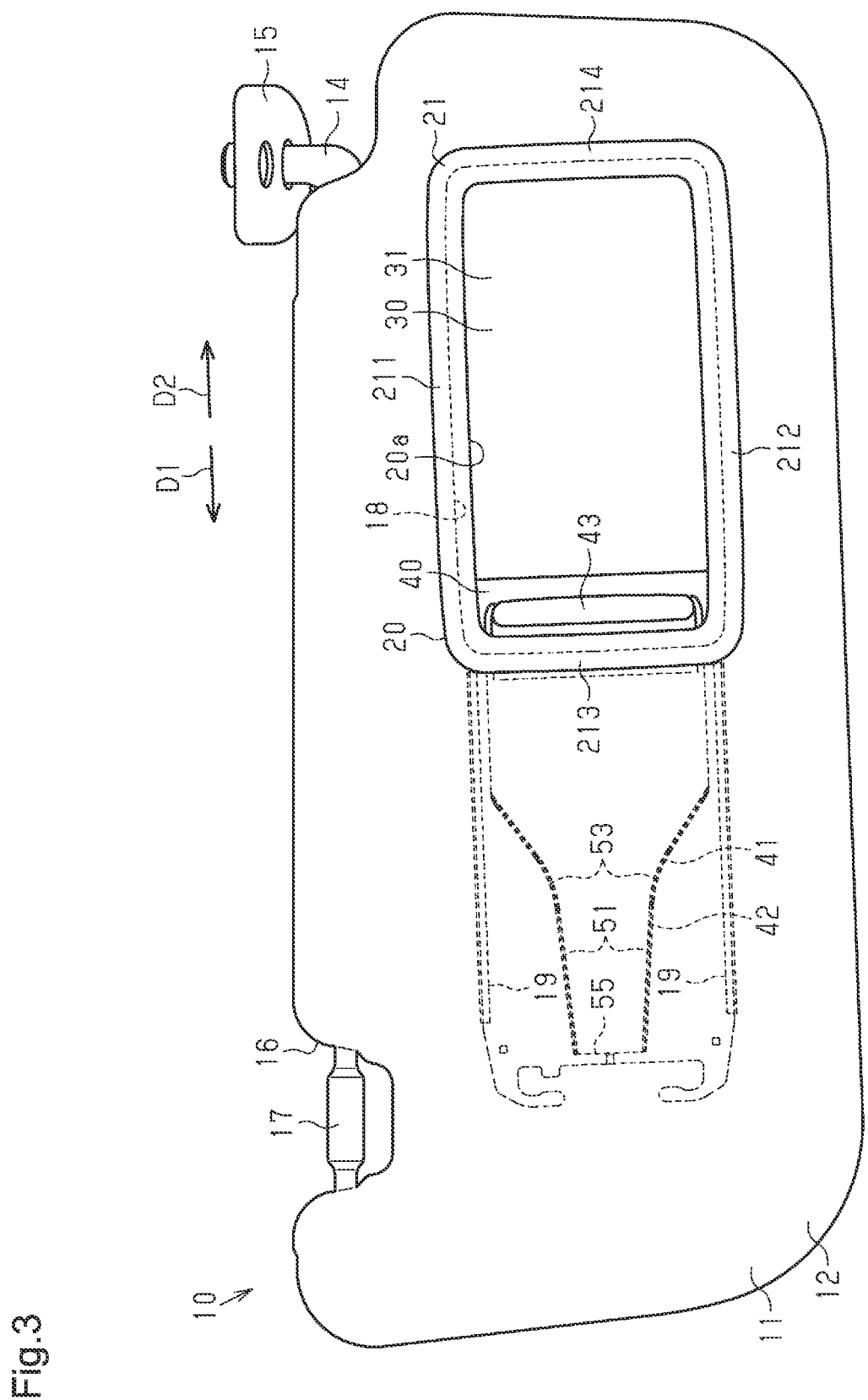
FIG. 3 is a plan view showing the vehicle sun visor of FIG. 1 with the mirror cover at an open position.

As shown in FIGS. 1, 2, and 3, the vehicle sun visor 10 includes a visor main body 11 including a frame 20, which is a frame portion, a mirror 30, and a mirror cover 40. The vehicle sun visor 10 may be attached to a front section of the ceiling of the vehicle, for example. The vehicle sun visor 10 is used to prevent light from the outside from directly entering the eyes of an occupant in the passenger compartment.

<Visor Main Body 11>

Referring to FIG. 1, the visor main body 11 is made of a plastic material. The visor main body 11 includes a first half member 12, a second half member 13, and the frame 20. The frame 20 is thus a part of the visor main body 11. The first half member 12 and the second half member 13 are shell-shaped. The first and second half members 12 and 13 are coupled to each other to form the visor main body 11. The first and second half members 12 and 13 are stacked and joined to each other. The visor main body 11 is hollow and has the shape of a flat plate. The visor main body 11 is rectangular in plan view. When placed in a vehicle, the longitudinal direction of the visor main body 11 agrees with the vehicle width direction.

<Arm 14>

The vehicle sun visor 10 includes an arm 14. The arm 14 is columnar and bent to be substantially L-shaped. The arm 14 includes a first end supported on the ceiling of the vehicle via a bracket 15, for example. The arm 14 includes a second end inserted in a bearing portion (not shown) of the visor main body 11.

<Use Position and Retracted Position>

The visor main body 11 is rotatable about the arm 14 relative to the vehicle ceiling. The visor main body 11 can rotate relative to the vehicle ceiling between a use position and a retracted position. The visor main body 11 at the use position faces the windshield. The visor main body 11 at the use position prevents light from the outside from directly entering the eyes of an occupant in the passenger compartment. When the visor main body 11 is at the use position, the first half member 12 faces the occupant, and the second half member 13 faces the vehicle windshield. The visor main body 11 at the retracted position extends along the vehicle ceiling. When the visor main body 11 is at the retracted position, the first half member 12 faces the vehicle ceiling, and the second half member 13 is located on the side opposite to the vehicle ceiling.

<Support Shaft 17>

The visor main body 11 includes a cutout section 16 at an edge. The vehicle sun visor 10 also includes a columnar support shaft 17. The support shaft 17 is attached to the visor main body 11 and extends across the cutout section 16 in the longitudinal direction of the visor main body 11. The support shaft 17 is engageable with a hook (not shown) disposed on the vehicle ceiling. The visor main body 11 can rotate about the arm 14 relative to the vehicle ceiling and about a straight line in the vehicle width direction with the support shaft 17 retained by the hook.

<Attachment Opening 18>

As shown in FIGS. 2 and 3, the visor main body 11 includes an attachment opening 18. The attachment opening 18 is formed in the first half member 12. In other words, the first half member 12 includes the attachment opening 18. The frame 20 is attached to the attachment opening 18. Thus, the frame 20 is disposed on the first half member 12, and the frame 20 and the first half member 12 are separate members. The attachment opening 18 has the shape of a rectangular hole in plan view. The longitudinal direction of the attachment opening 18 agrees with the longitudinal direction of the visor main body 11.

<Two Main Body Rails 19>

The visor main body 11 includes two main body rails 19. The two main body rails 19 are continuous with the attachment opening 18. The main body rails 19 extend in the longitudinal direction of the attachment opening 18. The main body rails 19 extend from the attachment opening 18 and are parallel to each other in the longitudinal direction of the visor main body 11. The main body rails 19 are disposed inside the visor main body 11. The two main body rails 19 serve as a slide mechanism that supports the mirror cover 40 in a slidable manner.

<Frame 20>

Figure 4:
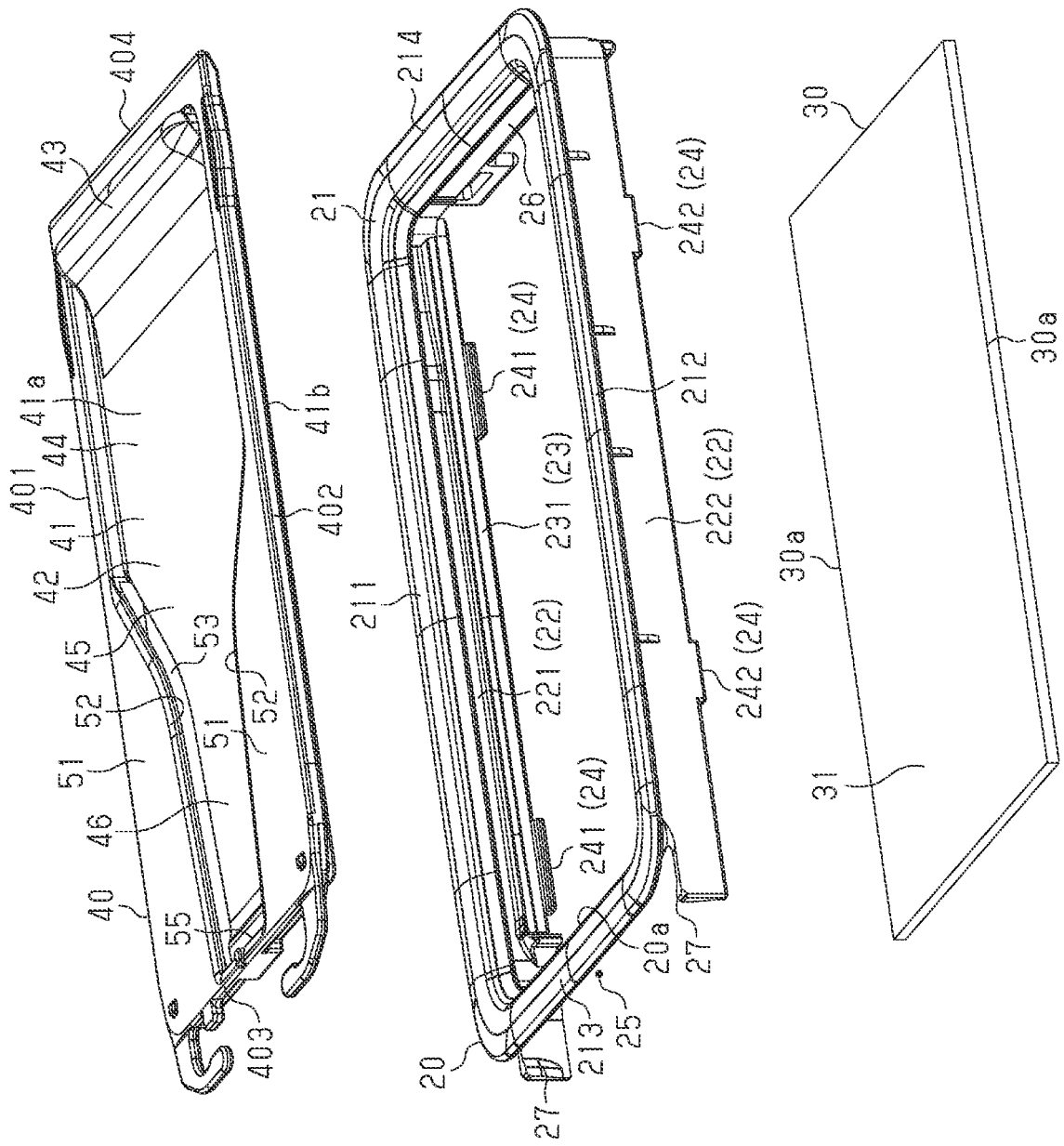
FIG. 4 is an exploded perspective view showing a frame, a mirror, and a mirror cover of the vehicle sun visor of FIG. 1.
Figure 5:
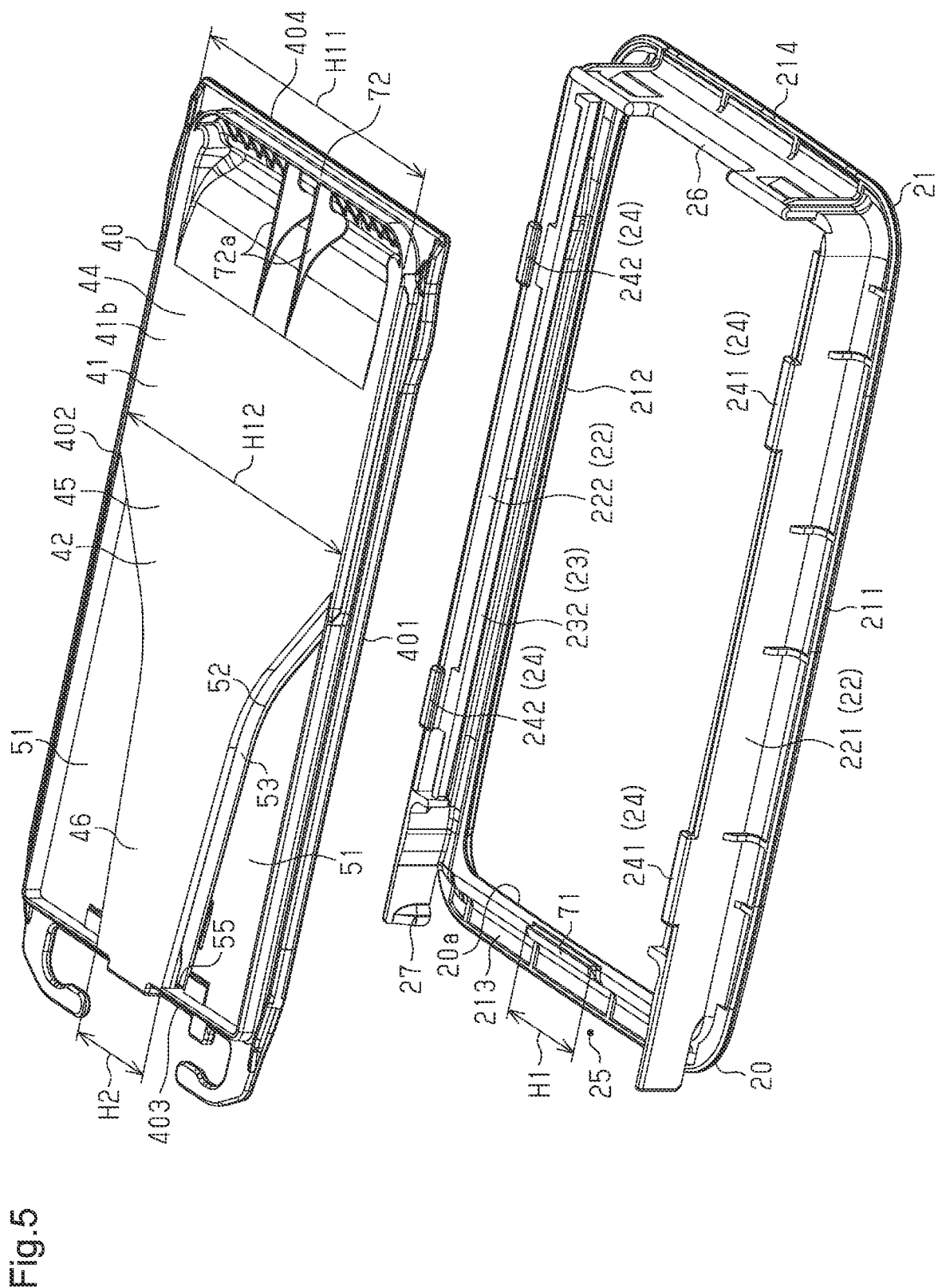
FIG. 5 is an exploded perspective view showing the frame and the mirror cover of the vehicle sun visor of FIG. 1.

As shown in FIGS. 4 and 5, the frame 20 is rectangular in plan view. The frame 20 includes a frame main body 21, two side walls 22, two frame rails 23, mirror support portions 24, a slide opening 25, and a frame stopper 26.

<Frame Main Body 21>

The frame main body 21 has the shape of a rectangular frame. The frame main body 21 includes a first frame plate 211, a second frame plate 212, a third frame plate 213, and a fourth frame plate 214. The first to fourth frame plates 211 to 214 are elongated plates. The first and second frame plates 211 and 212 extend parallel to each other in the longitudinal direction of the frame 20. The third and fourth frame plates 213 and 214 extend parallel to each other in the traverse direction of the frame 20. The third frame plate 213 connects a first longitudinal end of the first frame plate 211 to a first longitudinal end of the second frame plate 212. The fourth frame plate 214 connects a second longitudinal end of the first frame plate 211 to a second longitudinal end of the second frame plate 212. The side of the frame 20 in the longitudinal direction where the first ends of the first and second frame plates 211 and 212 are located is referred to as a first side, and the opposite side is referred to as a second side. The first to fourth frame plates 211 to 214 are connected together to have the same thickness direction. The first to fourth frame plates 211 to 214 define an opening 20a of the frame 20. That is, the frame 20 includes the opening 20a. The opening 20a of the frame 20 exposes the mirror 30. The opening 20a of the frame 20 has the shape of a rectangular hole.

<Two Side Walls 22>

The two side walls 22 are elongated plates. The side walls 22 are thin flat plates. The side walls 22 extend upright from the frame main body 21. The side walls 22 extend parallel to each other in the longitudinal direction of the frame 20. The longitudinal direction of the side walls 22 agrees with the longitudinal direction of the frame 20. One of the side walls 22 extends upright from the back surface of the first frame plate 211 facing the visor main body 11. The other side wall 22 extends upright from the back surface of the second frame plate 212 facing the visor main body 11. The side walls 22 extend upright from the frame main body 21 to have the same thickness direction. In the following description, the side wall 22 extending from the first frame plate 211 may be referred to as a first side wall 221, and the side wall 22 extending from the second frame plate 212 may be referred to as a second side wall 222.

<Two Frame Rails 23>

The frame rails 23 support the mirror cover 40 in a slidable manner. The frame rails 23 are elongated plates. The frame rails 23 extend upright from the side walls 22. Specifically, one of the frame rails 23 extends upright from the first side wall 221. The other frame rail 23 extends upright from the second side wall 222. The frame rails 23 extend parallel to each other in the longitudinal direction of the frame 20. The longitudinal direction of the frame rails 23 agrees with the longitudinal direction of the frame 20. The frame rails 23 face each other in the traverse direction of the frame 20. The frame rails 23 extend from the side walls 22 to have the same thickness direction. In the following description, the frame rail 23 extending upright from the first side wall 221 may be referred to as a first frame rail 231, and the frame rail 23 extending upright from the second side wall 222 may be referred to as a second frame rail 232.

<Mirror Support Portion 24>

The mirror support portions 24 support the mirror 30. Two mirror support portions 24 are disposed at each side wall 22. The mirror support portions 24 are disposed at the edges of the side walls 22 opposite to the frame main body 21. The two mirror support portions 24 disposed at the first side wall 221 are hook-shaped protrusions extending from the first side wall 221 toward the second side wall 222. The two mirror support portions 24 disposed at the second side wall 222 are hook-shaped protrusions extending from the second side wall 222 toward the first side wall 221. In the following description, the two mirror support portions 24 disposed at the first side wall 221 may be referred to as first mirror support portions 241, and the two mirror support portions 24 disposed at the second side wall 222 may be referred to as second mirror support portions 242.

The first mirror support portions 241 face the first frame rail 231 in the thickness direction of the first frame rail 231. The clearance between the first mirror support portions 241 and the first frame rail 231 is slightly larger than the thickness of the mirror 30. The second mirror support portions 242 face the second frame rail 232 in the thickness direction of the second frame rail 232. The clearance between the second mirror support portions 242 and the second frame rail 232 is slightly larger than the thickness of the mirror 30.

<Slide Opening 25>

The slide opening 25 opens the space between the side walls 22 at the first side in the longitudinal direction of the frame 20. Specifically, the slide opening 25 is a space defined by the first longitudinal end of the first side wall 221, the first longitudinal end of the second side wall 222, and the third frame plate 213.

<Frame Stopper 26>

The frame stopper 26 is an elongated plate. The frame stopper 26 is a thin flat plate. The frame stopper 26 extends upright from the frame main body 21. The frame stopper 26 extends upright from the back surface of the fourth frame plate 214 facing the visor main body 11. The longitudinal direction of the frame stopper 26 agrees with the traverse direction of the frame 20. The frame stopper 26 includes a first longitudinal end connected to the second longitudinal end of the first side wall 221. The frame stopper 26 includes a second longitudinal end connected to the second longitudinal end of the second side wall 222. The frame stopper 26 thus closes the space between the two side walls 22 at the second side in the longitudinal direction of the frame 20.

<Mirror 30>

As shown in FIG. 4, the mirror 30 has the shape of a flat plate. The mirror 30 is rectangular. The mirror 30 includes two long side edges 30a extending in the longitudinal direction. The mirror 30 is supported by the frame 20 with its two long side edges 30a placed between the first mirror support portions 241 and the first frame rail 231 and between the second mirror support portions 242 and the second frame rail 232. The mirror support portions 24 retain the long side edges 30a of the mirror 30 to limit dropping of the mirror 30 from the frame 20. The mirror 30 is thus attached to the frame 20. The mirror 30 is attached to the frame 20 with the mirror surface 31 of the mirror 30 facing the opening 20a of the frame 20. The mirror 30 is immovable relative to the frame 20.

<Mirror Cover 40>

The mirror cover 40 has the shape of a rectangular plate. The mirror cover 40 is made of a plastic material. The mirror cover 40 includes a first cover edge 401, a second cover edge 402, a third cover edge 403, and a fourth cover edge 404. The first and second cover edges 401 and 402 extend parallel to each other in the longitudinal direction of the mirror cover 40. The third and fourth cover edges 403 and 404 extend parallel to each other in the traverse direction of the mirror cover 40. The third cover edge 403 connects a first longitudinal end of the first cover edge 401 to a first longitudinal end of the second cover edge 402. The fourth cover edge 404 connects a second longitudinal end of the first cover edge 401 to a second longitudinal end of the second cover edge 402. The first to fourth cover edges 401 to 404 form the periphery of the mirror cover 40.

<Closed Position and Open Position>

The mirror cover 40 can slide relative to the frame 20 between a closed position to cover the mirror 30 and an open position to expose the mirror 30. FIG. 2 shows a state in which the mirror cover 40 is at the closed position. As shown in FIG. 2, the mirror cover 40 covers the mirror 30 by moving from the interior of the visor main body 11 to a position where the mirror cover 40 overlaps with the opening 20a of the frame 20. FIG. 3 shows a state in which the mirror cover 40 is at the open position. As shown in FIG. 3, the mirror cover 40 exposes the mirror 30 by retracting into the interior of the visor main body 11 from the opening 20a of the frame 20. When the mirror cover 40 is retracted into the interior of the visor main body 11 through the opening 20a of the frame 20, the two main body rails 19 guide the movement of the mirror cover 40 into the visor main body 11.

As shown in FIGS. 4 and 5, the two frame rails 23 support the mirror cover 40 in a slidable manner. This allows the mirror cover 40 to slide relative to the visor main body 11. The two main body rails 19 and the frame rails 23 form rails that support the mirror cover 40 in a slidable manner.

The mirror cover 40 can slide into and out of the frame 20 through the slide opening 25. The opening direction of the mirror cover 40 and the closing direction of the mirror cover 40 agree with the longitudinal directions of the visor main body 11. The third cover edge 403 of the mirror cover 40 is the edge on the leading side in the opening direction of the mirror cover 40. The fourth cover edge 404 of the mirror cover 40 is the edge on the leading side in the closing direction of the mirror cover 40. The third frame plate 213 is a section of the frame 20 on the leading side in the opening direction of the mirror cover 40. The fourth frame plate 214 is a section of the frame 20 on the leading side in the closing direction of the mirror cover 40. The mirror cover 40 includes a plate-shaped cover main body 41, plate-shaped card holding portions 51, and a card stopper portion 55.

The first longitudinal end of the first side wall 221 and the first longitudinal end of the second side wall 222 of the frame 20 have projections 27, which face each other. The projections 27 limit rattling of the mirror cover 40 in its thickness direction relative to the frame 20 when the mirror cover 40 is moved to slide in the opening direction.

<Cover Main Body 41>

The cover main body 41 includes a main body-side holding portion 42 and a grip portion 43. That is, the mirror cover 40 includes the grip portion 43. The cover main body 41 includes a front surface 41a, which is opposite to the mirror 30, and a back surface 41b, which is located on the side where the mirror 30 is disposed. Thus, the front surface 41a of the cover main body 41 is the surface of the cover main body 41 that is on the side opposite to the mirror 30.

<Main Body-Side Holding Portion 42>

Figure 6:
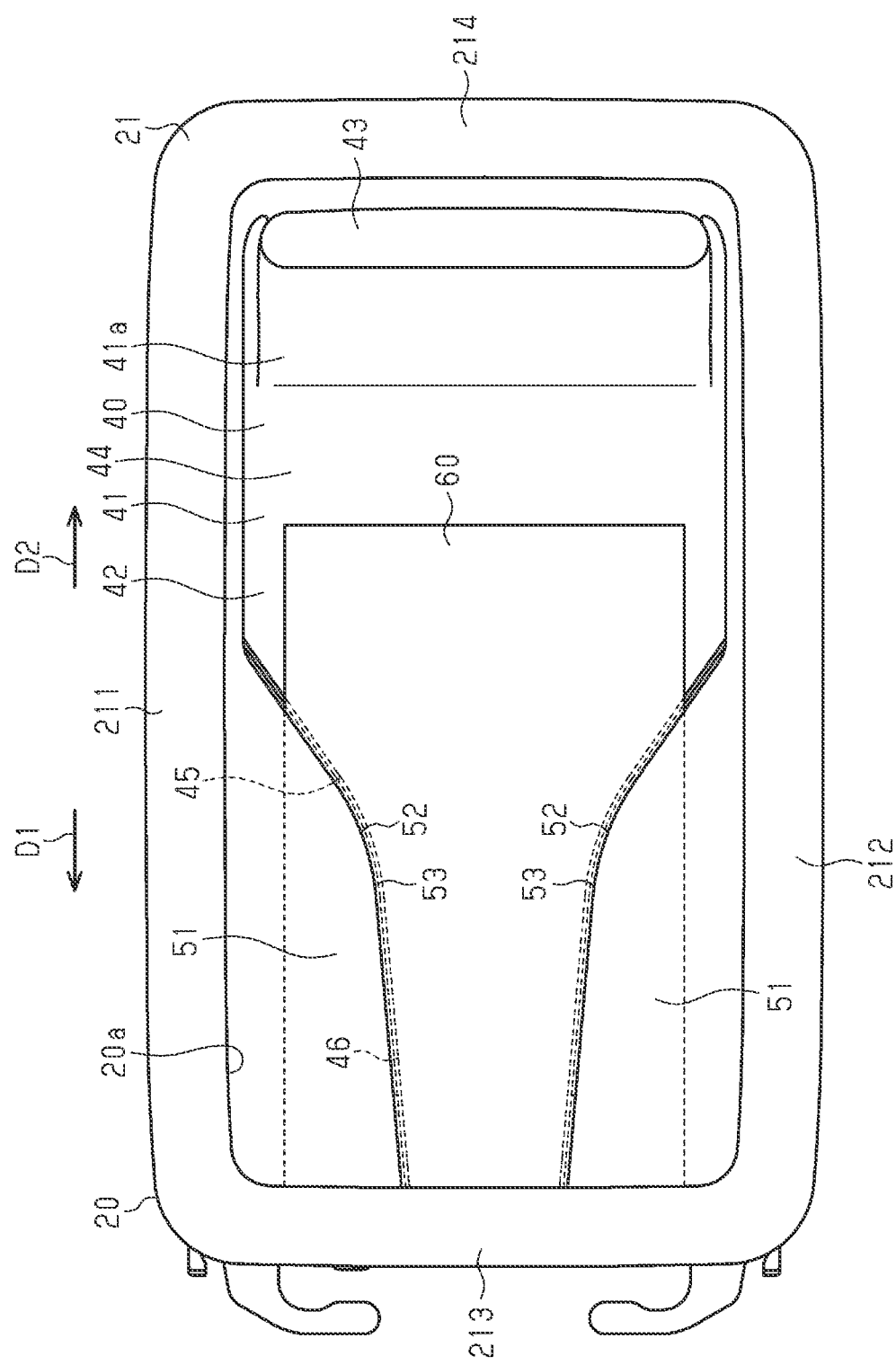
FIG. 6 is a plan view showing the frame and the mirror cover of the vehicle sun visor of FIG. 1 and a card.
Figure 7:
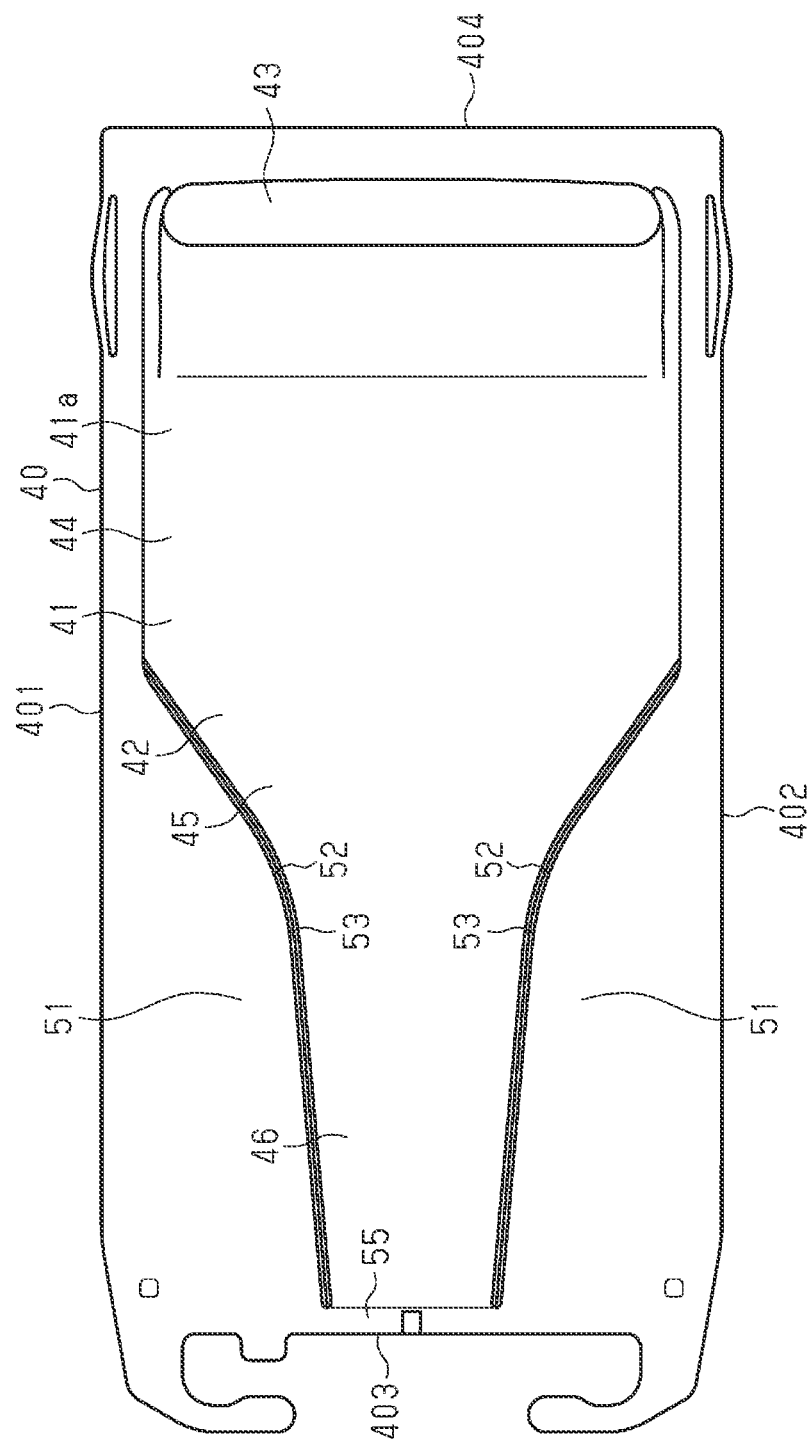
FIG. 7 is a plan view of the mirror cover of the vehicle sun visor of FIG. 1.

As shown in FIGS. 6 and 7, the main body-side holding portion 42 includes a first plate section 44, a second plate section 45, and a third plate section 46. The first plate section 44, the second plate section 45, and the third plate section 46 are arranged side by side in that order in the longitudinal direction of the mirror cover 40. Specifically, the first plate section 44, the second plate section 45, and the third plate section 46 are arranged in that order from the fourth cover edge 404 toward the third cover edge 403 in plan view. The first plate section 44 is therefore located on the leading side of the second plate section 45 in the closing direction of the mirror cover 40. The third plate section 46 is located on the leading side of the second plate section 45 in the opening direction of the mirror cover 40.

The first plate section 44 is rectangular in plan view. The second plate section 45 is continuous with the first plate section 44. The second plate section 45 has a trapezoidal shape and a decreasing width as the second plate section 45 extends away from the first plate section 44. That is, the second plate section 45 becomes narrower in the opening direction of the mirror cover 40 from the first plate section 44. The third plate section 46 is continuous with the second plate section 45. The third plate section 46 has an elongated shape that tapers away from the second plate section 45 in plan view. Thus, the third plate section 46 tapers from the second plate section 45 in the opening direction of the mirror cover 40.

<Grip Portion 43>

The grip portion 43 is gripped to slide the mirror cover 40 relative to the frame 20. The grip portion 43 is continuous with a section of the first plate section 44 opposite from the second plate section 45. The grip portion 43 is located closer to the fourth cover edge 404 than the first plate section 44. The grip portion 43 protrudes from the front surface 41a of the cover main body 41. Thus, the grip portion 43 protrudes from the end portion of the front surface 41a of the cover main body 41 on the leading side in the closing direction of the mirror cover 40.

<Card Holding Portions 51>

The mirror cover 40 has two card holding portions 51. Specifically, the card holding portions 51 are disposed on either side of the second plate section 45 and the third plate section 46 in plan view. The two card holding portions 51 are spaced apart from the front surface 41a of the cover main body 41. That is, the two card holding portions 51 are spaced apart from the surface of the cover main body 41 that is on the side opposite to the mirror 30. One of the card holding portions 51 is continuous with the first cover edge 401 of the mirror cover 40. The other card holding portion 51 is continuous with the second cover edge 402 of the mirror cover 40.

<Slits 53>

As shown in FIGS. 4 and 5, each card holding portion 51 includes a slit edge 52 extending along the second and third plate sections 45 and 46 in plan view. Thus, the main body-side holding portion 42 extends along and between the card holding portions 51 in plan view. Slits 53 are formed between the card holding portions 51 and the second and third plate sections 45 and 46. Thus, the slits 53 are formed between the cover main body 41 and the card holding portions 51. The slits 53 are formed between the main body-side holding portion 42 and the card holding portions 51. In other words, the two slits 53 are formed between the cover main body 41 and the card holding portions 51.

<Card Stopper Portion 55>

The card stopper portion 55 has the shape of a plate extending upright from the third plate section 46. The card stopper portion 55 extends upright from the end of the third plate section 46 on the side where the third cover edge 403 of the mirror cover 40 is located. That is, the card stopper portion 55 extends upright from the end of the third plate section 46 on the leading side in the opening direction of the mirror cover 40. The card stopper portion 55 extends along the third cover edge 403 of the mirror cover 40. The card stopper portion 55 connects the third plate section 46 to the third cover edge 403 of the mirror cover 40.

<Card 60>

As shown in FIG. 6, a card 60 is inserted in the slits 53. The insertion direction D1 of the card 60 relative to the slits 53 agrees with the opening direction of the mirror cover 40. The card 60 inserted into the slits 53 comes into contact with the card stopper portion 55, so that the further insertion of the card 60 relative to the slits 53 is restricted. The main body-side holding portion 42 and the card holding portions 51 hold the card 60 inserted in the slits 53. The removal direction D2 of the card 60 relative to the slits 53 agrees with the closing direction of the mirror 30.

<First Stopper Portion 71>

As shown in FIG. 5, the vehicle sun visor 10 includes a first stopper portion 71. The first stopper portion 71 is disposed at the third frame plate 213 of the frame 20. That is, the first stopper portion 71 is disposed at a section of the frame 20 that is located on the leading side in the opening direction of the mirror cover 40. The first stopper portion 71 protrudes toward the mirror cover 40. The first stopper portion 71 protrudes from a central section of the third frame plate 213 in the extension direction of the third frame plate 213 toward the mirror cover 40.

The first stopper portion 71 is disposed between the two card holding portions 51. The first stopper portion 71 protrudes from the third frame plate 213 toward the main body-side holding portion 42. The first stopper portion 71 has a width H1, which is slightly smaller than the width H2 of the end portion of the third plate section 46 opposite to the second plate section 45. Thus, the width H1 of the first stopper portion 71 is slightly smaller than the width H2 of the end portion of the third plate section 46 on the leading side in the opening direction of the mirror cover 40.

<Second Stopper Portion 72>

The vehicle sun visor 10 includes a second stopper portion 72. The second stopper portion 72 is disposed at the end portion of the mirror cover 40 on the side where the fourth cover edge 404 is located. That is, the second stopper portion 72 is disposed at the end portion of the mirror cover 40 on the leading side in the closing direction of the mirror cover 40. The second stopper portion 72 is disposed on the back surface 41b of the cover main body 41 and protrudes toward the mirror 30 from the end portion of the mirror cover 40 on the side where the fourth cover edge 404 is located. The second stopper portion 72 has the shape of a thin plate extending along the fourth cover edge 404. The second stopper portion 72 has a width H11, which is slightly smaller than the width H12 of the first plate section 44. The second stopper portion 72 is closer to the first plate section 44 than the fourth cover edge 404. Thus, the second stopper portion 72 is spaced apart from the fourth cover edge 404. The second stopper portion 72 is connected to the first plate section 44 through ribs 72a. This increases the rigidity of the second stopper portion 72.

<Third Stopper Portion 73>

Figure 8:
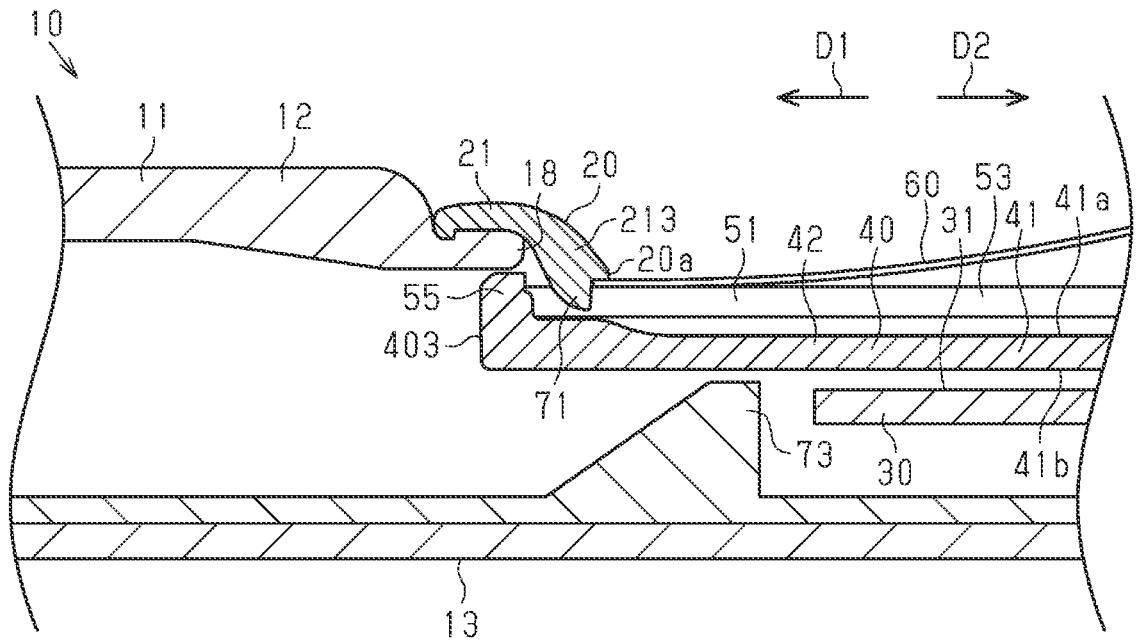
FIG. 8 is a cross-sectional view showing the vehicle sun visor of FIG. 1 in a state in which a first stopper portion restricts insertion of a card.
Figure 9:
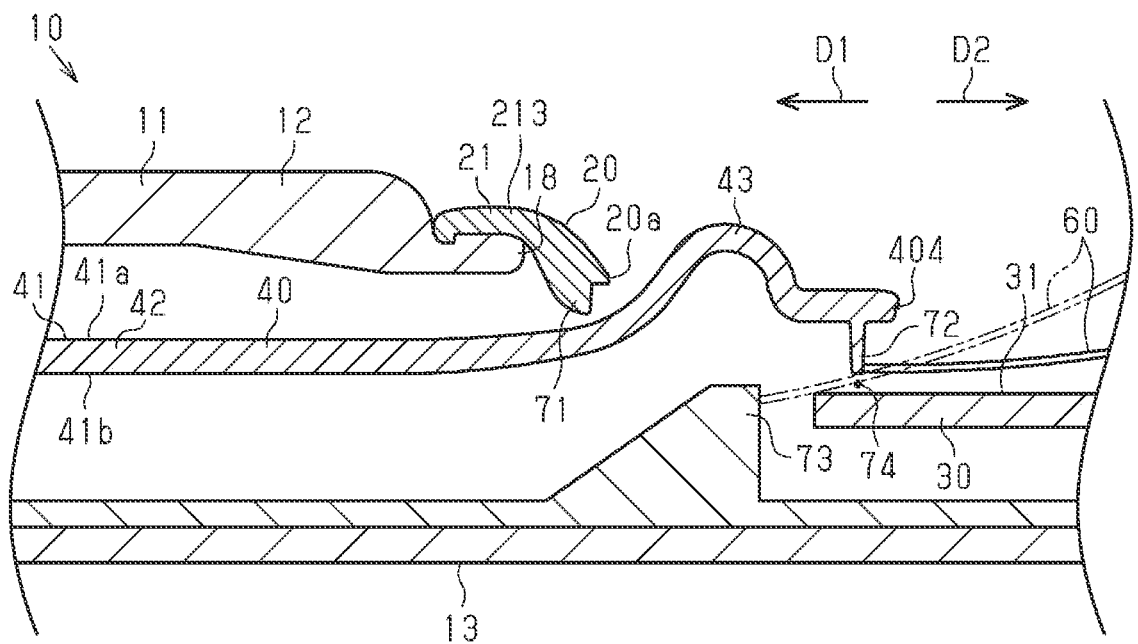
FIG. 9 is a cross-sectional view showing the vehicle sun visor of FIG. 1 in a state in which a second stopper portion restricts insertion of a card.

As shown in FIGS. 8 and 9, a third stopper portion 73 is disposed inside the visor main body 11. That is, the vehicle sun visor 10 includes the third stopper portion 73. The third stopper portion 73 is formed in the second half member 13. The third stopper portion 73 protrudes toward the attachment opening 18 from the inner surface of the second half member 13 facing the attachment opening 18. In other words, the third stopper portion 73 protrudes toward the opening 20a from a section of the visor main body 11 facing the opening 20a of the frame 20.

As shown in FIG. 9, the third stopper portion 73 faces, in an insertion direction D1 of the card 60, a gap 74 formed between the second stopper portion 72 and the mirror 30 when the mirror cover 40 is at the open position. Specifically, the distal end section of the third stopper portion 73 faces the gap 74 in the insertion direction D1 of the card 60. Thus, the third stopper portion 73 faces, in the opening direction of the mirror cover 40, the gap 74 formed between the second stopper portion 72 and the mirror 30 when the mirror cover 40 is at the open position.

<Insertion Opening 75>

Figure 10:
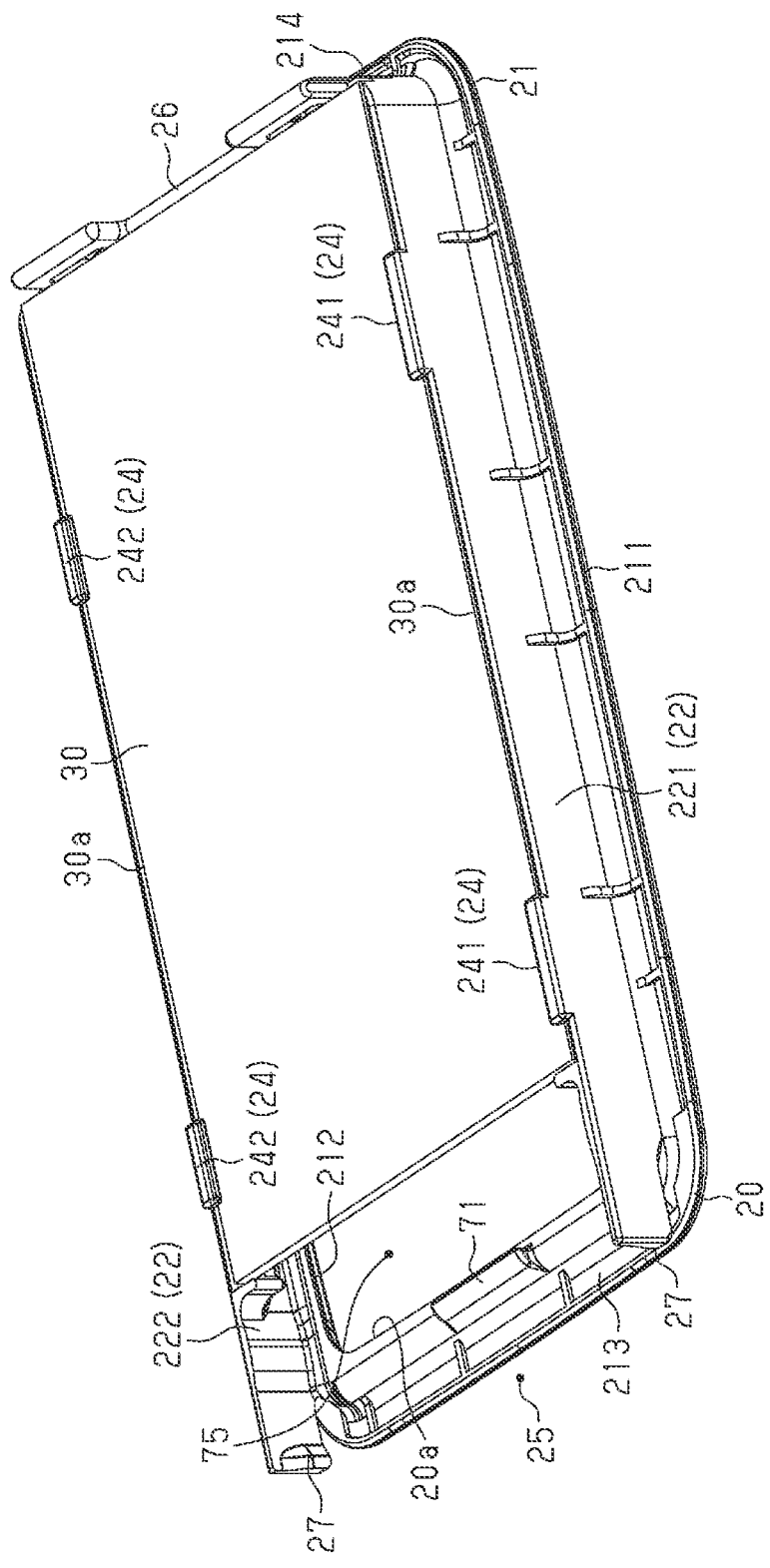
FIG. 10 is a perspective view showing the frame and the mirror of FIG. 4 with the mirror supported by the frame.

As shown in FIG. 10, in a state in which the frame 20 supports the mirror 30, an insertion opening 75 is formed between the third frame plate 213 of the frame 20 and the mirror 30. That is, the insertion opening 75 is provided between the mirror 30 and a section of the frame 20 on the leading side in the opening direction of the mirror cover 40.

Figure 11:
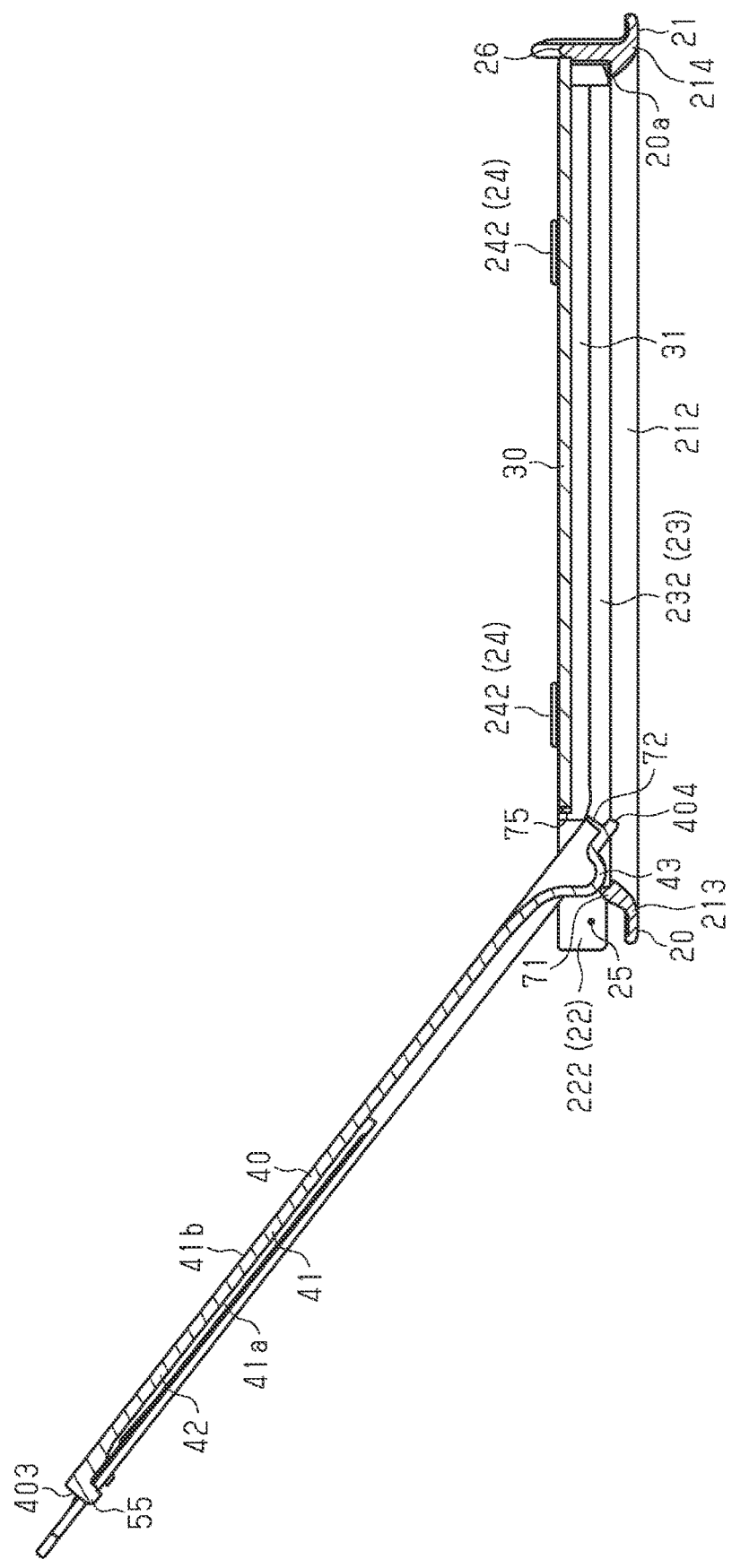
FIG. 11 is a cross-sectional view showing the frame and the mirror of FIG. 10 with the mirror cover being inserted into an insertion opening.
Figure 12:
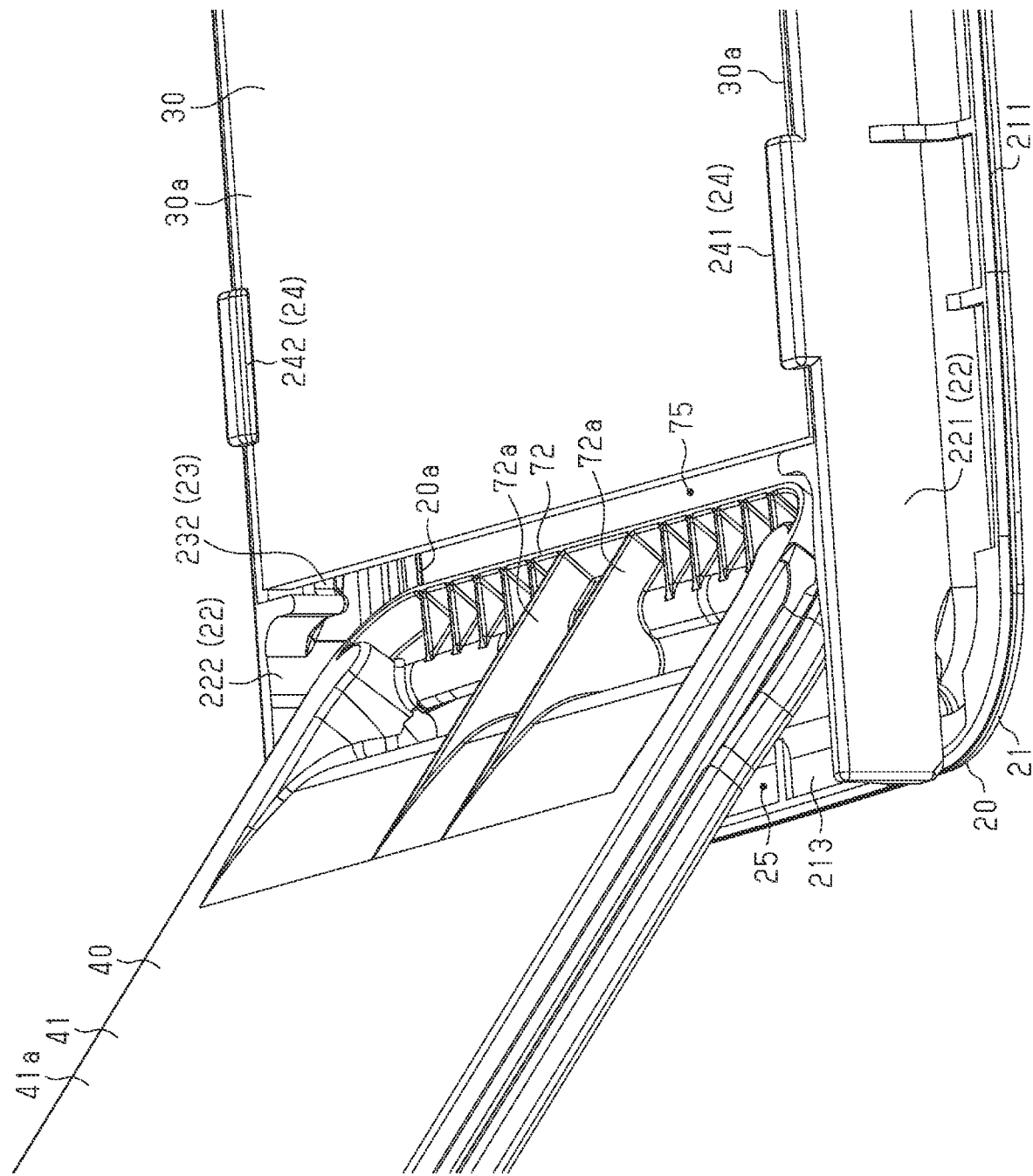
FIG. 12 is a perspective view showing the frame and the mirror of FIG. 10 with the mirror cover being inserted into the insertion opening.

As shown in FIGS. 11 and 12, to attach the mirror cover 40 to the frame rails 23, the fourth cover edge 404 of the mirror cover 40 is obliquely inserted into the insertion opening 75. At this time, the mirror cover 40 is obliquely inserted toward the frame rails 23 so that the grip portion 43 passes beyond the frame 20. The insertion opening 75 is configured such that the grip portion 43 passes beyond the frame 20 when the mirror cover 40 is obliquely inserted into the insertion opening 75 toward the frame rails 23.

The second stopper portion 72 is disposed at a position that does not interfere with the mirror 30 while the mirror cover 40 is obliquely inserted into the insertion opening 75 toward the frame rails 23. Specifically, since the second stopper portion 72 is spaced apart from the fourth cover edge 404, the second stopper portion 72 does not interfere with the mirror 30 when the mirror cover 40 is inserted obliquely through the insertion opening 75 toward the frame rails 23.

<Operation>

Operation of the present embodiment is now described.

Figure 13:
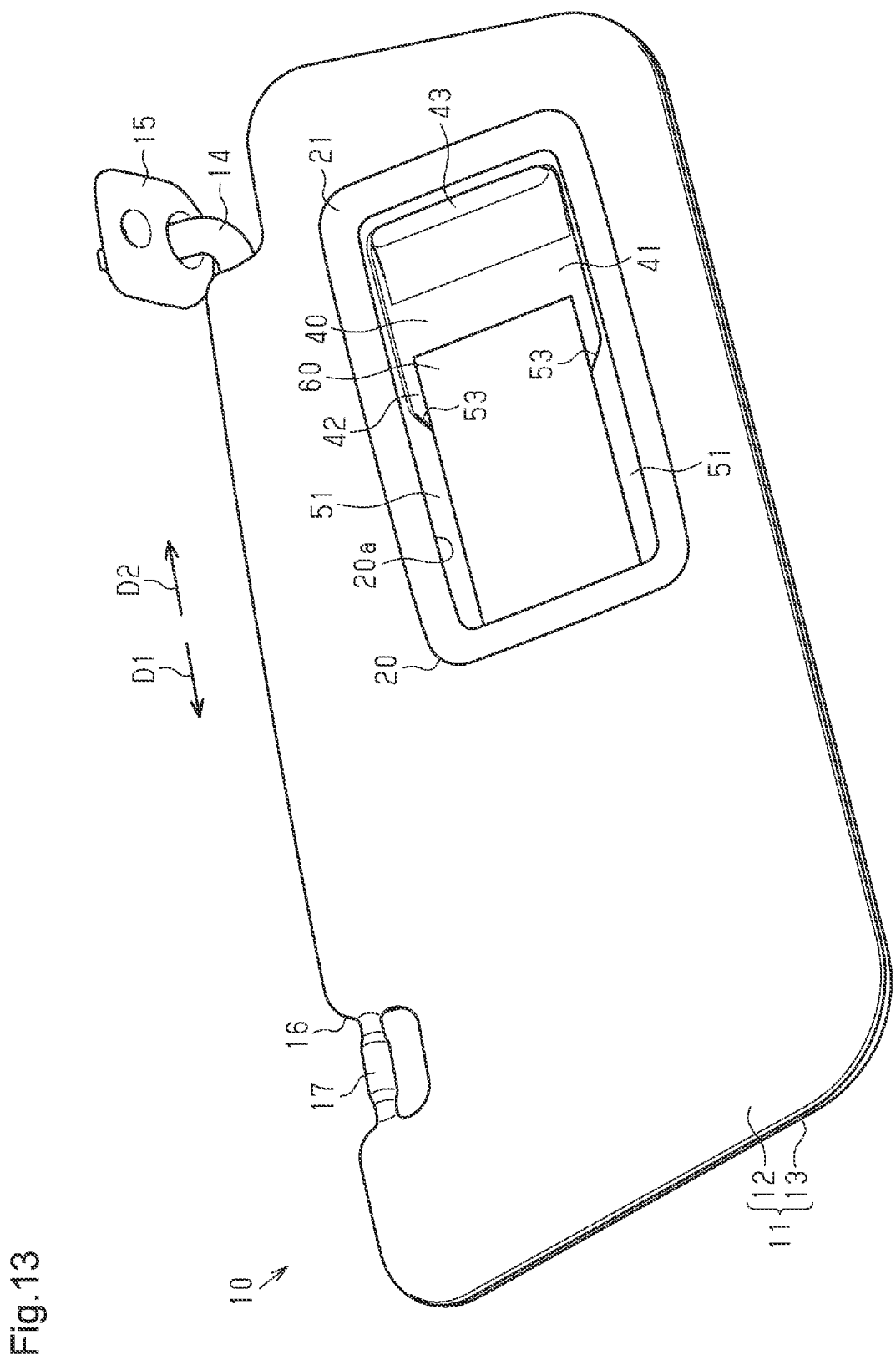
FIG. 13 is a diagram showing the vehicle sun visor of FIG. 1 with a card erroneously inserted between the frame and the mirror cover.

As shown in FIG. 13, when the mirror cover 40 is at the closed position, an occupant may erroneously insert the card 60 between the frame 20 and the mirror cover 40, for example. In this case, as shown in FIG. 8, the card 60 comes into contact with the first stopper portion 71, and thus the insertion of the card 60 between the frame 20 and the mirror cover 40 is restricted. In this manner, the first stopper portion 71, which protrudes toward the mirror cover 40, restricts the insertion of the card 60 between the frame 20 and the mirror cover 40.

Figure 14:
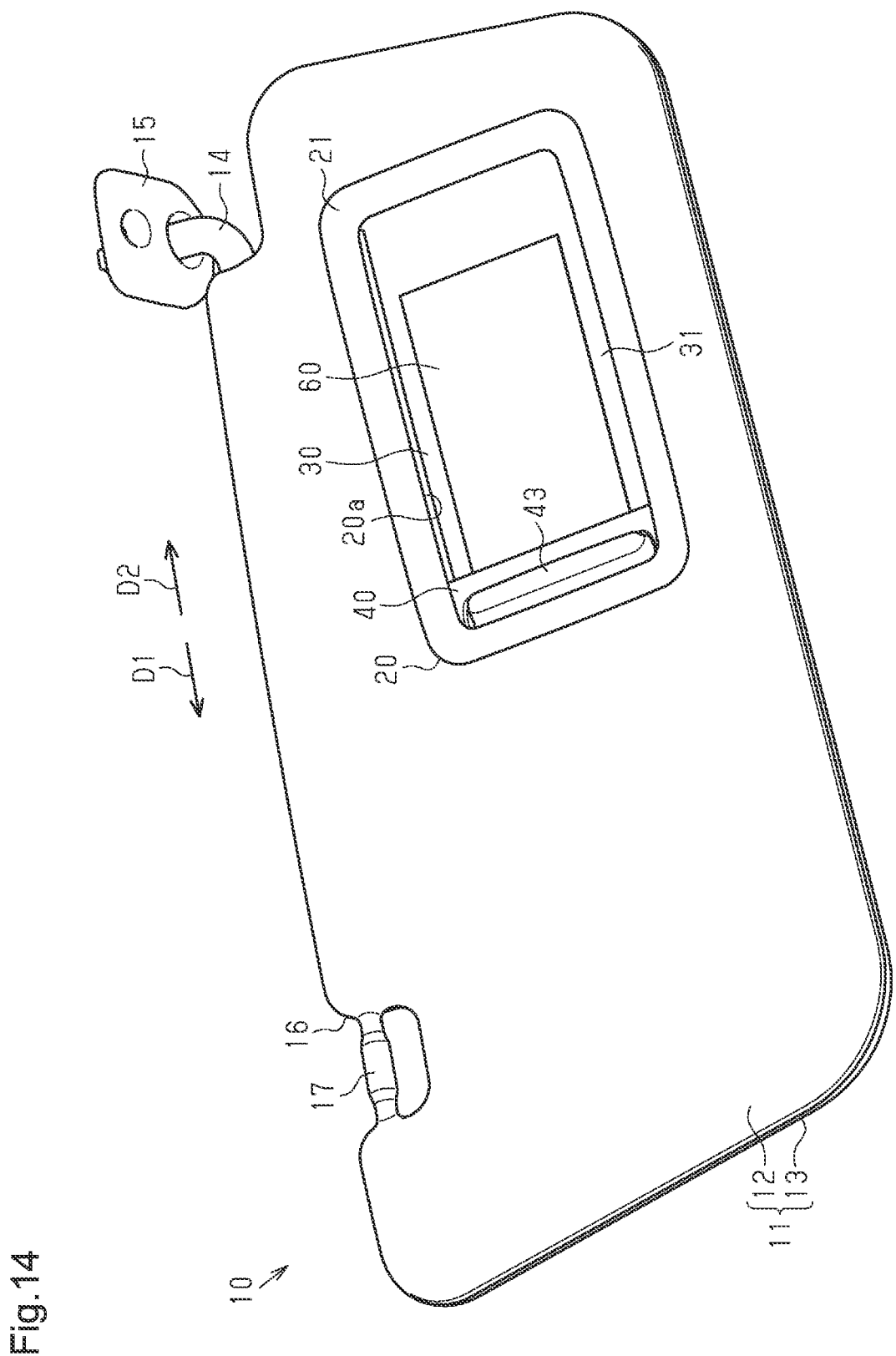
FIG. 14 is a diagram showing the vehicle sun visor of FIG. 1 with a card erroneously inserted between the mirror cover and the mirror.

As shown in FIG. 14, when the mirror cover 40 is at the open position, an occupant may erroneously insert the card 60 between the mirror cover 40 and the mirror 30, for example. In this case, as shown in FIG. 9, the card 60 comes into contact with the second stopper portion 72, and thus the insertion of the card 60 between the mirror cover 40 and the mirror 30 is restricted. In this manner, the second stopper portion 72, which protrudes toward the mirror 30, restricts the insertion of the card 60 between the mirror cover 40 and the mirror 30.

As indicated by the long-dash double-short-dash lines in FIG. 9, when the mirror cover 40 is at the open position, a part of the card 60 may be inserted beyond the gap 74 between the second stopper portion 72 and the mirror 30. At this time, the second stopper portion 72 presses the card 60 toward the mirror 30. Thus, the card 60 that extends beyond the gap 74 between the second stopper portion 72 and the mirror 30 is likely to come into contact with the third stopper portion 73. In this manner, the second and third stopper portions 72 and 73 restrict the insertion of the card 60 into a space between the mirror cover 40 and the mirror 30.

<Advantages>

The above embodiment has the following advantages.

(1) The vehicle sun visor 10 includes the first stopper portion 71. The first stopper portion 71 is disposed on a section of the frame 20 on the leading side in the opening direction of the mirror cover 40. The first stopper portion 71, which protrudes toward the mirror cover 40, restricts the insertion of the card 60 between the frame 20 and the mirror cover 40. As a result, when an occupant erroneously inserts the card 60 between the frame 20 and the mirror cover 40 located at the closed position, the first stopper portion 71 restricts the insertion of the card 60 between the frame 20 and the mirror cover 40. The vehicle sun visor 10 also includes the second stopper portion 72. The second stopper portion 72 is disposed at the end portion of the mirror cover 40 on the leading side in the closing direction of the mirror cover 40. The second stopper portion 72, which protrudes toward the mirror 30, restricts the insertion of the card 60 between the mirror cover 40 and the mirror 30. As a result, when an occupant erroneously inserts the card 60 between the mirror 30 and the mirror cover 40 located at the open position, the second stopper portion 72 restricts the insertion of the card 60 between the mirror cover 40 and the mirror 30. This prevents the card 60 from entering the interior of the visor main body 11 when the card 60 is erroneously inserted.

(2) The mirror cover 40 includes the plate-shaped cover main body 41 and the plate-shaped card holding portions 51, which are spaced apart from the surface of the cover main body 41 that is on the side opposite to the mirror 30. The slits 53, into which the card 60 is inserted, are formed between the cover main body 41 and the card holding portions 51. The insertion direction D1 of the card 60 relative to the slits 53 agrees with the opening direction of the mirror cover 40. The vehicle sun visor 10 thus configured tends to cause erroneous insertion of the card 60. However, the entry of the card 60 into the interior of the visor main body 11 is avoided even with such a vehicle sun visor 10.

(3) The first stopper portion 71 is disposed between the two card holding portions 51 and protrudes toward the main body-side holding portion 42. As such, the first stopper portion 71 formed on the frame 20 does not interfere with the card holding portions 51. Accordingly, the restriction of insertion of the card 60 between the frame 20 and the mirror cover 40 is achieved without significantly changing the design.

(4) The second stopper portion 72 is disposed at a position that does not interfere with the mirror 30 when the mirror cover 40 is inserted obliquely through the insertion opening 75 toward the frame rails 23. Thus, the second stopper portion 72 can be formed on the mirror cover 40 without inhibiting the attachment of the mirror cover 40 to the frame rails 23. As such, the restriction of insertion of the card 60 between the mirror cover 40 and the mirror 30 is achieved without significantly changing the design.

(5) Inside the visor main body 11, the third stopper portion 73 is disposed such that it protrudes toward the opening 20a from a section of the visor main body 11 facing the opening 20a of the frame 20. The third stopper portion 73 faces, in the opening direction of the mirror cover 40, the gap 74 formed between the second stopper portion 72 and the mirror 30 when the mirror cover 40 is at the open position. For example, when the mirror cover 40 is at the open position, a part of the card 60 may be inserted beyond the gap 74 between the second stopper portion 72 and the mirror 30. At this time, since the second stopper portion 72 presses the card 60 toward the mirror 30, the card 60 that extends beyond the gap 74 between the second stopper portion 72 and the mirror 30 is likely to come into contact with the third stopper portion 73. In this manner, the second and third stopper portions 72 and 73 restrict the insertion of the card 60 into a space between the mirror cover 40 and the mirror 30. This prevents the card 60 from entering the interior of the visor main body 11 when the card 60 is erroneously inserted.

Modifications

The above-described embodiment may be modified as follows. The above-described embodiment and the following modifications may be combined to the extent that does not cause technical contradiction.

In the above-described embodiment, if the vehicle sun visor 10 includes the first stopper portion 71, the vehicle sun visor 10 does not have to include the second stopper portion 72. Likewise, if the vehicle sun visor 10 includes the second stopper portion 72, the vehicle sun visor 10 does not have to include the first stopper portion 71. In short, the vehicle sun visor 10 only needs to include at least one of the first and second stopper portions 71 and 72.

In the above-described embodiment, the vehicle sun visor 10 does not have to include the third stopper portion 73.

In the above-described embodiment, there is no limitation to the width H1 of the first stopper portion 71 if the width H1 is smaller than the width H2 of the end portion of the third plate section 46 on the leading side in the opening direction of the mirror cover 40.

In the above-described embodiment, there is no limitation to the width H11 of the second stopper portion 72 if the width H11 is smaller than the width H12 of the first plate section 44.

In the above-described embodiment, the cover main body 41 may include two main body-side holding portions 42, and the mirror cover 40 may include a card holding portion 51 that extends along and between the main body-side holding portions 42 in plan view. That is, if the first stopper portion 71 formed on the frame 20 does not interfere with the card holding portions 51, the positional relationship between the main body-side holding portion 42 and the card holding portions 51 may be changed.

In the above-described embodiment, the vehicle sun visor 10 may have only one slit 53 between the cover main body 41 and the card holding portions 51. That is, the vehicle sun visor 10 does not have to have two slits 53 between the cover main body 41 and the card holding portions 51.

In the above-described embodiment, each side wall 22 may have only one mirror support portion 24 or three or more mirror support portions 24. In short, there is no limitation to the number of mirror support portions 24.

In the above-described embodiment, the shape of the mirror 30 may be changed as appropriate. In this case, the shapes of the frame 20 and the mirror cover 40 may also be changed according to the shape of the mirror 30.

In the above-described embodiment, the shape of the visor main body 11 may be changed.

In the above-described embodiment, the material of the visor main body 11 may be changed.

In the above-described embodiment, the first half member 12 and the second half member 13 may be connected via a hinge, for example.

In the above-described embodiment, the mirror 30 does not have to be attached to the frame 20. In this case, the visor main body 11 may have a support member capable of supporting the mirror 30 separately from the frame 20, for example. This support member may be attached to the inner surface of the second half member 13, for example. Also, the support member may have a third stopper portion 73. That is, the third stopper portion 73 may have any configuration if it is disposed inside the visor main body 11 and protrudes toward the opening 20a of the frame 20 from a section of the visor main body 11 facing the opening 20a.

In the above-described embodiment, the visor main body 11 does not have to include the frame 20. For example, a frame portion including the opening 20a may be integrally formed in advance as a part of the first half member 12 so that the frame portion is seamlessly continuous with the first half member 12. The frame portion including the opening 20a does not have to be a separate member from the first half member 12.

In the above-described embodiment, the mirror cover 40 does not have to include the card holding portions 51 or the slits 53. In this case, as long as the vehicle sun visor 10 includes the first stopper portion 71, the first stopper portion 71 restricts the insertion of the card 60 between the frame 20 and the mirror cover 40. Likewise, as long as the vehicle sun visor 10 includes the second stopper portion 72, the second stopper portion 72 restricts the insertion of the card 60 between the mirror cover 40 and the mirror 30.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle sun visor, comprising:
   a hollow visor main body that includes a frame portion including an opening;

a mirror that is attached to the frame portion to face the opening; and a mirror cover configured to slide, relative to the visor main body, between a closed position at which the mirror cover covers the mirror and an open position at which the mirror cover exposes the mirror, wherein the mirror cover is configured to be positioned at the closed position by moving from an interior of the visor main body to a position at which the mirror cover overlaps with the opening, and to be positioned at the open position by retracting into the interior of the visor main body from the opening, and the vehicle sun visor further comprises:
- a first stopper portion that is disposed at a section of the frame portion on a leading side in an opening direction of the mirror cover and protrudes toward the mirror cover; and
- a second stopper portion that is disposed at an end portion of the mirror cover on a leading side in a closing direction of the mirror cover and protrudes toward the mirror wherein the mirror cover includes:
- a plate-shaped cover main body including a front surface opposite to the mirror and a back surface located on the side where the mirror is disposed;
- a grip portion configured to be gripped to slide the mirror cover relative to the visor main body;
- the grip portion protrudes from an end portion of the front surface of the cover main body on the leading side in the closing direction toward a side opposite to the mirror; and
- the second stopper portion protrudes from an end portion of the back surface of the cover main body on the leading side in the closing direction toward the mirror and faces, in the closing direction, a section of the cover main body on the leading side in the opening direction.

2. The vehicle sun visor according to claim 1, wherein the mirror cover further includes:
- a plate-shaped card holding portion spaced apart from the front surface,
- a slit is disposed between the cover main body and the card holding portion, the slit being configured so that a card is insertable into the slit, and
- an insertion direction of the card relative to the slit agrees with the opening direction of the mirror cover.

3. The vehicle sun visor according to claim 2, wherein the card holding portion of the mirror cover is one of two card holding portions,
the cover main body includes a main body-side holding portion that extends along and between the two the card holding portions in plan view,
the slit is disposed between the main body-side holding portion and each of the two card holding portions, and
the first stopper portion is disposed between the two card holding portions and protrudes toward the main body-side holding portion.

4. The vehicle sun visor according to claim 1, wherein the visor main body includes:
- two rails configured to support the mirror cover in a slidable manner; and
- a mirror support portion configured to support the mirror,
the frame portion includes an insertion opening between the mirror and the section of the frame portion on the leading side in the opening direction,
the insertion opening is configured such that the grip portion passes beyond the frame portion when the mirror cover is inserted obliquely into the insertion opening toward the two rails, and
the second stopper portion is disposed at a position that does not interfere with the mirror when the mirror cover is inserted obliquely into the insertion opening toward the two rails.

5. The vehicle sun visor according to claim 4, wherein a gap is formed between the second stopper portion and the mirror when the mirror cover is positioned at the open position,
a third stopper portion is disposed inside the visor main body and protrudes toward the opening from a section of the visor main body facing the opening, and
the third stopper portion faces the gap in the opening direction.

6. The vehicle sun visor according to claim 1, wherein a gap is formed between the second stopper portion and the mirror when the mirror cover is positioned at the open position,
a third stopper portion is disposed inside the visor main body and protrudes toward the opening from a section of the visor main body facing the opening, and
the third stopper portion faces the gap in the opening direction.

7. A vehicle sun visor, comprising:
a hollow visor main body that includes a frame portion including an opening;
a mirror that is attached to the frame portion to face the opening; and
a mirror cover configured to slide, relative to the visor main body, between a closed position at which the mirror cover covers the mirror and an open position at which the mirror cover exposes the mirror, wherein
the mirror cover is configured to be positioned at the closed position by moving from an interior of the visor main body to a position at which the mirror cover overlaps with the opening, and to be positioned at the open position by retracting into the interior of the visor main body from the opening, and
the vehicle sun visor further comprises:
- a first stopper portion that is disposed at a section of the frame portion on a leading side in an opening direction of the mirror cover and protrudes toward the mirror cover; and
- a second stopper portion that is disposed at an end portion of the mirror cover on a leading side in a closing direction of the mirror cover and protrudes toward the mirror wherein, the visor main body includes:
- two rails configured to support the mirror cover in a slidable manner; and
- a mirror support portion configured to support the mirror,
the mirror cover includes a grip portion configured to be gripped to slide the mirror cover relative to the visor main body,
the grip portion protrudes from the end portion of the mirror cover on the leading side in the closing direction,
the frame portion includes an insertion opening between the mirror and the section of the frame portion on the leading side in the opening direction,
the insertion opening is configured such that the grip portion passes beyond the frame portion when the mirror cover is inserted obliquely into the insertion opening toward the two rails, and the second stopper portion is disposed at a position that does not interfere with the mirror when the mirror cover is inserted obliquely into the insertion opening toward the two rails.

8. A vehicle sun visor, comprising:

a hollow visor main body that includes a frame portion including an opening;

a mirror that is attached to the frame portion to face the opening; and a mirror cover configured to slide, relative to the visor main body, between a closed position at which the mirror cover covers the mirror and an open position at which the mirror cover exposes the mirror, wherein the mirror cover is configured to be positioned at the closed position by moving from an interior of the visor main body to a position at which the mirror cover overlaps with the opening, and to be positioned at the open position by retracting into the interior of the visor main body from the opening, and the vehicle sun visor further comprises:
  a first stopper portion that is disposed at a section of the frame portion on a leading side in an opening direction of the mirror cover and protrudes toward the mirror cover; and
  a second stopper portion that is disposed at an end portion of the mirror cover on a leading side in a closing direction of the mirror cover and protrudes toward the mirror wherein a gap is formed between the second stopper portion and the mirror when the mirror cover is positioned at the open position, a third stopper portion is disposed inside the visor main body and protrudes toward the opening from a section of the visor main body facing the opening, and
  the third stopper portion faces the gap in the opening direction.

* * * * *